US010072201B2

(12) United States Patent
Livanec et al.

(10) Patent No.: US 10,072,201 B2
(45) Date of Patent: Sep. 11, 2018

(54) THERMAL THICKENING IN INVERT EMULSION TREATMENT FLUIDS

(71) Applicant: HALLIBURTON ENERGY SERVICES, INC., Houston, TX (US)

(72) Inventors: Philip Wayne Livanec, Houston, TX (US); Jay Paul Deville, Spring, TX (US); Chesnee Lae Davis, The Woodlands, TX (US); Jonathan Paul Walker, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 14/902,427

(22) PCT Filed: May 17, 2014

(86) PCT No.: PCT/US2014/038515
§ 371 (c)(1),
(2) Date: Dec. 31, 2015

(87) PCT Pub. No.: WO2015/178874
PCT Pub. Date: Nov. 26, 2015

(65) Prior Publication Data
US 2016/0369151 A1  Dec. 22, 2016

(51) Int. Cl.
*C09K 8/36* (2006.01)
*E21B 43/04* (2006.01)
*E21B 21/00* (2006.01)
*E21B 41/02* (2006.01)
*C09K 8/502* (2006.01)

(52) U.S. Cl.
CPC .............. *C09K 8/36* (2013.01); *E21B 21/003* (2013.01); *E21B 41/02* (2013.01); *E21B 43/04* (2013.01); *C09K 8/502* (2013.01); *C09K 2208/32* (2013.01)

(58) Field of Classification Search
CPC .......... C09K 8/584; C09K 8/588; C09K 8/68; C09K 8/88; C09K 8/36; C09K 2208/02; C09K 8/42; C09K 8/502; C09K 8/52; C09K 8/64; C09K 8/72; C09K 8/74; C09K 8/82; C09K 8/26; C09K 8/57; E21B 37/06; E21B 43/04; E21B 43/16; E21B 43/26; E21B 31/03; E21B 7/00
See application file for complete search history.

(56) References Cited

U.S. PATENT DOCUMENTS

| 5,990,050 | A | * | 11/1999 | Patel | C09K 8/32 507/136 |
| 6,838,514 | B2 | | 1/2005 | Yeung et al. | |
| 7,696,131 | B2 | | 4/2010 | Oyler et al. | |
| 7,696,133 | B2 | * | 4/2010 | Cowan | C09K 8/5083 507/100 |
| 8,333,242 | B2 | | 12/2012 | Gupta et al. | |
| 8,476,201 | B2 | | 7/2013 | Miller et al. | |
| 2008/0015118 | A1 | * | 1/2008 | Oyler | C09K 8/32 507/138 |
| 2008/0194433 | A1 | | 8/2008 | Tehrani | |
| 2011/0306523 | A1 | * | 12/2011 | Yu | B01F 17/005 507/131 |
| 2012/0264655 | A1 | | 10/2012 | Fitch et al. | |

FOREIGN PATENT DOCUMENTS

| CA | 1266559 A | | 3/1990 |
| CA | 2318563 A1 | | 7/1999 |
| EP | 0753034 | * | 11/1998 |
| EP | 0753034 B1 | | 11/1998 |
| EP | 0957149 A2 | | 11/1999 |
| WO | 2014001192 A1 | | 1/2014 |
| WO | WO 2014/001192 | * | 1/2014 |

OTHER PUBLICATIONS http://www.glossary.oilfield.slb.com/Terms/o/oil_base_mud.aspx downloaded on Nov. 8, 2016.*
http://www.glossary.oilfield.slb.com/Terms/i/invert_ emulsion.aspx, downloaded on Nov. 4, 2017.*
Office Action issued in related CA application No. 2920792, dated Mar. 7, 2016 (4 pages).
Examination Report issued in related UK application No. GB1600689.2, dated Apr. 1, 2016 (4 pages).
International Search Report and Written Opinion issued in related PCT Application No. PCT/US2014/038515, dated Feb. 17, 2015 (17 pages).
Portnoy, et al., "Novel Polymeric Oil Mud Viscosifier for High-Temperature Drilling" IADC/SPE 14795, 1986 Drilling Conference, Feb. 10-12, 1986, Dallas TX, 8 pages.
International Preliminary Report on Patentability issued in related Application No. PCT/US2014/038515, dated Dec. 1, 2016 (12 pages).

* cited by examiner

*Primary Examiner* — Kumar R Bhushan
(74) *Attorney, Agent, or Firm* — Tenley Krueger; Baker Botts L.L.P.

(57) ABSTRACT

Among the methods provided is a method comprising: providing an invert emulsion fluid formed by combining components that comprise: an oil-based continuous phase; an aqueous discontinuous phase; and a glycol ether additive that comprises a glycol ether and using the invert emulsion fluid to drill at least a portion of a well bore penetrating at least a portion of a subterranean formation.

8 Claims, 4 Drawing Sheets

THERMAL THICKENING IN INVERT EMULSION TREATMENT FLUIDS

CROSS-REFERENCE TO RELATED APPLICATION

The present application is a U.S. National Stage Application of International Application No. PCT/US2014/038515 filed May 17, 2014, which is incorporated herein by reference in its entirety for all purposes.

BACKGROUND

The present disclosure relates to methods and compositions for treating well bores in subterranean formations, and more particularly to oil-based treatment fluids and additives suitable for such fluids to improve their suspension characteristics.

A drilling fluid, or "mud" which a drilling fluid is also often called, is a specially designed fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

Specific drilling fluid systems are selected to optimize a drilling operation in accordance with the characteristics of a particular geological formation. A drilling fluid typically comprises water and/or oil, synthetic oil, or other synthetic material or fluid as a base fluid, with solids in suspension. A non-aqueous based drilling fluid typically contains oil or a synthetic fluid as a continuous phase and may also contain water dispersed in the continuous phase by emulsification so that there is no distinct layer of water in the fluid. Such dispersed water in oil is generally referred to as an invert emulsion or water-in-oil emulsion. A number of additives may be included in such oil based drilling fluids and invert emulsions to improve certain properties of the fluid. Such additives may include, for example, emulsifiers, weighting agents, fluid-loss additives or fluid-loss control agents, viscosifiers or viscosity control agents, and alkali.

An essential criterion for assessing the utility of a fluid as a drilling fluid or as a well service fluid may include the fluid's rheological parameters, particularly under simulated drilling and well bore conditions. For use as a drilling fluid, or as a fluid for servicing a well, a fluid generally should be capable of maintaining certain viscosities suitable for drilling and circulation in the well bore. Preferably, a drilling fluid will be sufficiently viscous to be capable of supporting and carrying the well drill cuttings to the surface without being so viscous as to interfere with the drilling operation. Moreover, a drilling fluid must be sufficiently viscous to be able to suspend barite and other weighting agents. However, increased viscosity can result in problematic sticking of the drill string, and increased circulating pressures can contribute to lost circulation problems.

Commonly, additives are included in the drilling fluid to increase the viscosity or carrying capacity of the fluid. These additives may include solids, including fine or colloidal solids, that may add density to the weight of the fluid while at the same time increasing its viscosity. However, the addition of solids may be detrimental as a fluid may exhibit better rheological properties in a clean state. Faster drilling rates may also be achieved by employing low-solids or solids-free fluids in some cases. When porous hydrocarbon-producing formations are drilled, the size and composition of suspended solids may be regulated to provide optimal bridging and minimize invasion. Calcium carbonate may be used in these situations as it may generally be acid-soluble, and thus provides a removable filter cake. Other clay-based solids commonly used in drilling fluids may be less desirable since they do not provide the same advantage.

Organophilic clays may commonly be used as the viscosity-building agent in oil-based muds. These generally comprise amine-treated bentonite or hectorite clay, which may typically require vigorous agitation in the fluid to reach a fully active state and provide an increase in viscosity. Time pressures may demand that fluids be prepared quickly for shipment to the drilling operation. As a result, inadequate shear and over-treatment may occur when using organophilic clays.

In addition, small particles of solid matter may ultimately be too small to be effectively removed from the system by surface processing equipment during and after completion of the well bore. As a result, fluids which do not contain organophilic clays may offer advantages in several aspects of drilling.

BRIEF DESCRIPTION OF THE DRAWINGS

These drawings illustrate certain aspects of some of the embodiments of the present disclosure, and should not be used to limit or define the claims.

DETAILED DESCRIPTION

Figure 1:
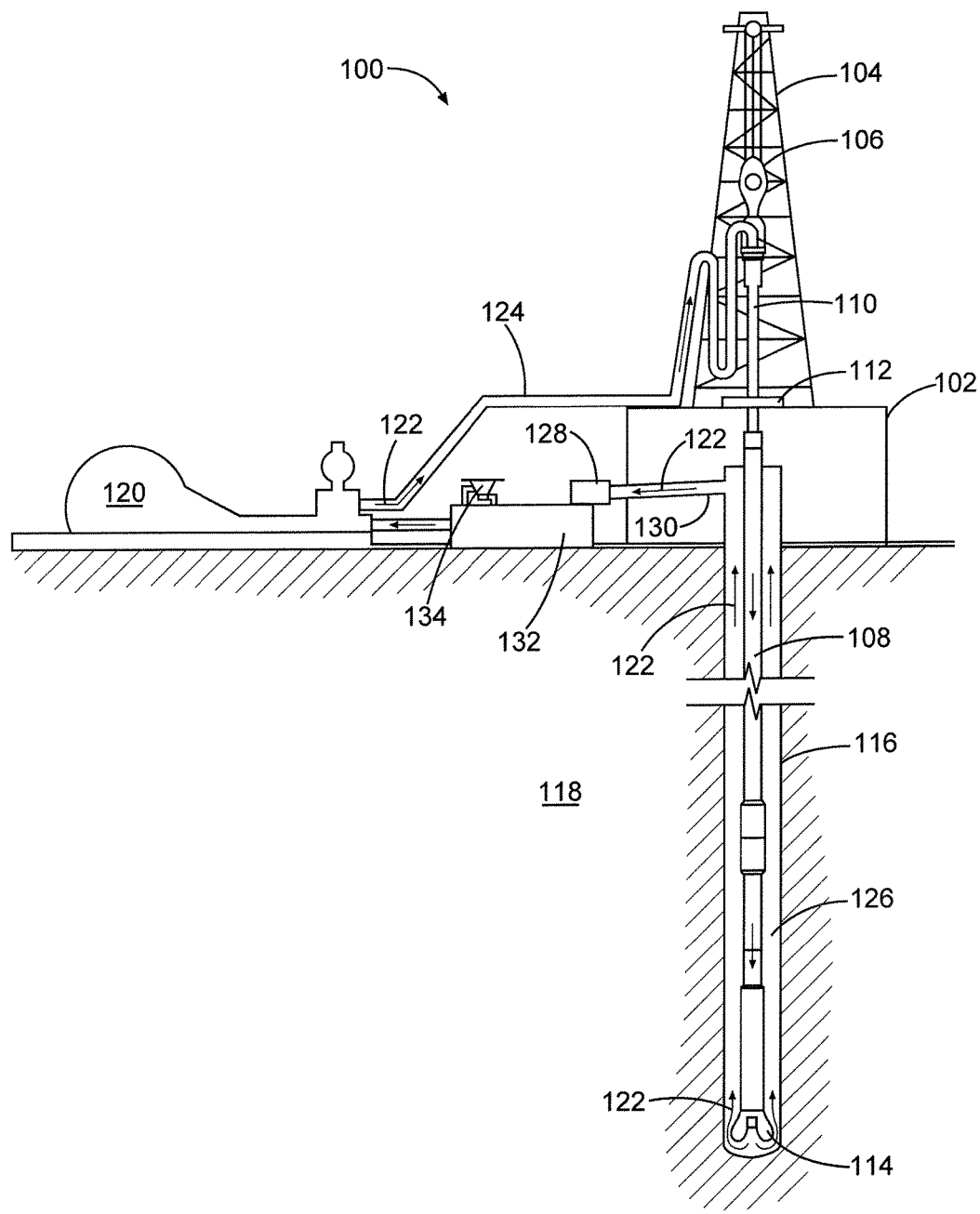
FIG. 1 illustrates an embodiment of a drilling assembly.

The present disclosure is generally related to methods and compositions for treating well bores in subterranean formations, and more particularly to oil-based treatment fluids and additives to improve their suspension characteristics.

While the methods and fluids of the present disclosure have many advantages, only some will be discussed herein. One advantage of the present disclosure may include the ability to create and use a fluid that exhibits acceptable fluid properties when used in a well, for example, as a drilling or workover fluid. Having a low-shear viscosity that increases with increasing temperature may be considered important characteristics for aiding in suspension of barite or other weighting materials. In an embodiment, a fluid of the present disclosure may have a low-shear viscosity that increases with increasing temperature. In an embodiment, the fluid may have a low-shear viscosity that increases with increasing temperature and a high-shear viscosity that does not increase, or decreases, with increasing temperature. In an embodiment, the low-shear viscosity may increase at temperatures above 120 degrees Fahrenheit.

In particular, the glycol either additives disclosed herein may be used to produce a treatment fluid with an increased low-shear viscosity at elevated temperatures without substantially increasing viscosity at high shear rates. Further, the glycol ether additives disclosed herein may be used in relatively small amounts to achieve the desirable rheological properties. The glycol ether additives may also be used as viscosifiers. The glycol ether additives may also be applied when a relatively high-viscosity volume of fluid is needed for various purposes, such as for a treatment fluid.

As used herein, the term "treatment fluid" refers generally to any fluid that may be used in a subterranean application in conjunction with a desired function and/or for a desired purpose. The term "treatment fluid" does not imply any particular action by the fluid or any component thereof. Examples of treatment fluids may include: drilling fluids, drill-in fluids, spacer fluids between different fluid types (cement and drilling fluid, for example), viscous packer fluids for suspending well operations, high-viscosity sweep fluids to aid in cuttings transport, and other various tasks requiring viscous fluids.

In some embodiments, the present disclosure applies to fluids and methods of influencing the rheology of treatment fluids comprising invert (water-in-oil) emulsions. In other embodiments, the present disclosure applies to fluids and methods of influencing the rheology of treatment fluids comprising oils. Among the methods provided is a method of drilling a subterranean well with an invert emulsion fluid comprising: providing an invert emulsion fluid, wherein the invert emulsion fluid has been formed by combining at least the following components: an oil-based continuous phase; an aqueous discontinuous phase; a glycol ether additive that comprises a glycol ether, wherein the glycol ether additive may substantially increase the low-shear viscosity at elevated temperatures of the invert emulsion fluid relative to a fluid without a glycol ether additive; and placing the invert emulsion fluid in a subterranean formation.

In some embodiments, the treatment fluids of the present disclosure may comprise an invert emulsion fluid that has been formed by combining at least the following components: an oil-based continuous phase; an aqueous discontinuous phase; a glycol ether additive that comprises a glycol ether. The glycol ether additive may be included in the invert emulsion in such quantities as are desired in order to obtain the appropriate fluid properties for a treatment operation, such as a specific well being drilled. Other common additives may be combined with the emulsion for various reasons, such as weighting agents or fluid loss control agents.

The oil-based continuous phase may comprise a base oil, which may or may not be combined with additional oils or miscible components. Suitable base oils include, but are not limited to, diesel oils, paraffinic oils, mineral oils, synthetic oils, or other such hydrocarbons, and combinations of these fluids. Paraffins or paraffinic oils useful in fluids comprising invert emulsion may be linear, branched, poly-branched, cyclic, or isoparaffins, preferably having about 10 to about 30 carbon atoms.

In an embodiment, a synthetic base oil may comprise ester oils, glycerides of fatty acids, aliphatic esters, aliphatic ethers, aliphatic acetal, or other such hydrocarbons and combinations of these fluids. Examples of ester oils for blending may be those comprising about $C_6$ to about $C_{14}$ fatty acids and alcohols. Another ester oil that may be used as a base oil comprised of about $C_{12}$ to about $C_{14}$ fatty acids and 2-ethyl hexanol or about $C_8$ fatty acids and 2-ethyl hexanol. This ester oil is available commercially under trade names PETROFREE® and PETROFREE LV™, respectively, from Halliburton Energy Services, Inc. in Houston, Tex.

Isomerized, or internal, olefins for blending with the esters for an ester blend may be any such olefins, straight chain, branched, or cyclic, preferably having about 10 to about 30 carbon atoms. Isomerized, or internal, olefins having about 40 to about 70 weight percent $C_{16}$ and about 20 to about 50 weight percent $C_{18}$ are especially preferred. An example of an isomerized olefin for use in an ester blend in the present disclosure that is commercially available is PETROFREE SF™ Base fluid, available from Halliburton Energy Services, Inc. in Houston, Tex. Alternatively, other hydrocarbons such as paraffins, mineral oils, or combinations thereof may be substituted for or added to the olefins in the ester blend. Such other hydrocarbons may comprise from about 1 weight percent to about 99 weight percent of such blend. In addition to those base oils listed above, a combination of the ester oil comprised of about $C_{12}$ to about $C_{14}$ fatty acids and 2-ethyl hexanol or about $C_8$ fatty acids and 2-ethyl hexanol with the isomerized olefin in an ester blend may also be used as a base oil. This blend is commercially available as ACCOLADE™ available from Halliburton Energy Services, Inc. in Houston, Tex.

Other examples of suitable invert emulsion base oils include isomerized olefins blended with other hydrocarbons such as linear alpha olefins, paraffins, or naphthenes, or combinations thereof ("hydrocarbon blends"). When blended with esters or other hydrocarbons such as isomerized olefins, linear alpha olefins, or naphthenes in the present disclosure, the paraffins should comprise at least about 1 weight percent to about 99 weight percent of the blend, but preferably less than about 50 weight percent. Naphthenes or naphthenic hydrocarbons for use in blends comprising invert emulsions may be any saturated, cycloparaffinic compound, composition or material with a general chemical formula of $C_nH_{2n}$ where n is a number about 5 to about 30.

The amount of base oil in the invert emulsion fluid may vary depending upon the particular base oil used, the particular aqueous fluid used, any additives included in the invert emulsion fluid, and the particular application in which the invert emulsion fluid is to be employed. However, generally the amount of base oil must be sufficient to form a stable emulsion when utilized as the continuous phase. In an embodiment, the amount of base oil is at least about 30, at least about 40, or alternatively at least about 50 percent by volume of the total fluid.

The aqueous-based discontinuous phase may comprise any aqueous fluid that is at least partly immiscible with the base oil. In an embodiment, the immiscible liquid phase may be an aqueous fluid. Typical aqueous fluids include, but are not limited to, substances such as fresh water, sea water, brine containing inorganic or organic dissolved salt compounds, mixtures containing water-miscible organic compounds (e.g., an alcohol, a glycerol, a glycol, etc.), and mixtures of these. In one embodiment the aqueous fluid is a brine solution including inorganic salts such as calcium halide salts, sodium halide salts, alkali metal halide salts and the like.

The amount of the aqueous fluid in the invert emulsion fluid may vary depending upon the particular aqueous fluid used and the particular application in which the invert emulsion fluid is to be employed. In an embodiment, the amount of aqueous fluid in the invert emulsion fluid should not be so great that it cannot be dispersed in the base oil phase. Therefore, the aqueous fluid may comprise about 1% to about 90% by volume of the total invert emulsion fluid. In another embodiment, the aqueous fluid may comprise about 30% to about 50% of the total volume of the invert emulsion fluid.

The glycol ether additives disclosed herein may be used to create an invert emulsion fluid with improved suspension characteristics suitable for use in a subterranean treatment operation. As used herein, "improved suspension characteristics" may refer to changes in the rheological properties of a fluid so that it may demonstrate improved suspension characteristics for weighting agents and drill cuttings, thus improving the ability of the fluid maintain barite or other weighting agent suspension. In an embodiment, the improved suspension characteristics may be characterized by rheological property changes including increasing a low-shear viscosity with increasing temperature, while keeping the keeping the high-shear viscosity the same or lower at increase temperatures as at lower temperatures. However, no specific fluid rheological threshold values are intended to be implied by the term improved suspension characteristics. An increased low-shear viscosity at increased temperatures may aid the fluid in maintaining suspension barite or other weighting materials in high temperature application while the fluid is not being circulated. In a particular embodiment, low-shear viscosity may increase as temperature increases between the temperatures of 120 degrees Fahrenheit and 500 degrees Fahrenheit. In an embodiment, low-shear viscosity at increased temperatures may allow for suspension of barite or other weighting materials for a longer period of time than in a fluid in which low-shear viscosity does not increase with increasing temperature. For example, barite or other weighting materials may be suspended for between five and seven days in a fluid that has increased low-shear viscosity at increased temperatures. A high-shear viscosity that does not increase with increasing temperature may aid in maintaining an appropriate equivalent circulating density (ECD) while being pumped at increased temperatures.

The rheological properties useful in describing the present disclosure include, but are not limited to, yield point ("YP"), low-shear viscosity, plastic viscosity ("PV"), the equivalent circulating density ("ECD"), and yield stress (tau zero). The YP is defined as the value obtained from the Bingham-Plastic rheological model when extrapolated to a shear rate of zero. It may be calculated using 300 revolutions per minute ("rpm") and 600 rpm shear rate readings on a standard oilfield rheometer. Similarly, the yield stress or Tau zero is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. Another means of estimating the yield stress is by calculating the low-shear yield point ("LSYP") by the same formula shown below in Equation 2 though with the 6 rpm and 3 rpm readings substituted for the 600- and 300-rpm readings, respectively. PV represents the viscosity of a fluid when extrapolated to infinite shear rate. A low PV may indicate that a fluid is capable of drilling rapidly because, among other things, the low viscosity of fluid exiting the drill bit and the ability to use an increased flow rate. A high PV may be caused by a viscous base fluid, excess colloidal solids, or both. The PV and YP are calculated by the following set of equations:

$$PV=(600 \text{ rpm reading})-(300 \text{ rpm reading}) \quad \text{(Equation 1)}$$

$$YP=(300 \text{ rpm reading})-PV \quad \text{(Equation 2)}$$

The ECD is the effective circulating density exerted by a fluid against the formation taking into account the flow rate and pressure drop in the annulus above the point being considered. A high PV may increase the ECD due to a greater pressure drop in the annulus caused by internal fluid friction.

The rheological properties useful in describing the present disclosure may be measured using standard testing procedures and standard testing equipment known to those skilled in the art. For example, properties such as plastic viscosity expressed in centipoises, low-shear viscosity expressed in dial readings, yield point and LSYP expressed in lb/100 ft$^2$, and gel strength expressed in lb/100 ft$^2$ may be determined by the "ANSI/API RP 13B-2: Recommended Practice for Field Testing Oil-based Drilling Fluids," using a 115-volt motor-driven viscometer, such as a FANN Model 77-A V-G Meter. The rotational measurements represent standard rates at which readings may be taken. Actual rotational rates may vary slightly and may be corrected using correction factors, if necessary. For example, different spring modules may be available for a FANN-77 Rheometer. An F1 spring module may be the standard module and may provide a dial reading at 300 RPM that reads directly in centipoise. An F0.2 spring module may read five times the deflection of an F1 spring module for the same shear stress, an F0.5 spring module may read twice the deflection of an F1 spring module, and an F2 spring module may read one half the deflection of an F1 spring module.

In an embodiment, the glycol ether additive may comprise any glycol ether. The glycol ether may be any glycol ether, such as triethylene glycol butyl ether (TGBE). Other examples of glycol ethers include triethylene glycol butyl ether, triethylene glycol propyl ether, triethylene glycol methyl ether, triethylene glycol ethyl ether, triethylene glycol isopropyl ether, diethylene glycol butyl ether, diethylene glycol propyl ether, diethylene glycol methyl ether, diethylene glycol ethyl ether, diethylene glycol isopropyl ether, ethylene glycol butyl ether, ethylene glycol propyl ether, ethylene glycol methyl ether, ethylene glycol ethyl ether, ethylene glycol isopropyl ether, propylene glycol butyl ether, propylene glycol propyl ether, propylene glycol methyl ether, propylene glycol ethyl ether, propylene glycol isopropyl ether, or any other glycol ether. In an embodiment the glycol ether additive may comprise a glycol ether and other additive compounds, such as viscosifying agents. For example, the glycol ether additive may be a mixture of TGBE and dimer/trimer fatty acids. An example of such a glycol ether additive is BDF-568.

The exemplary glycol ether additives disclosed herein may directly or indirectly affect one or more components or pieces of equipment associated with the preparation, delivery, recapture, recycling, reuse, and/or disposal of the disclosed glycol ether additives. For example, and with reference to FIG. 1, the disclosed glycol ether additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed glycol ether additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed glycol ether additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed glycol ether additives may be stored, reconditioned, and/or regulated until added to the drilling fluid 122.

As mentioned above, the disclosed glycol ether additives may directly or indirectly affect the components and equipment of the drilling assembly 100. For example, the disclosed glycol ether additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary glycol ether additives.

The disclosed glycol ether additives may directly or indirectly affect the pump 120, which representatively includes any conduits, pipelines, trucks, tubulars, and/or pipes used to fluidically convey the glycol ether additives downhole, any pumps, compressors, or motors (e.g., topside or downhole) used to drive the glycol ether additives into motion, any valves or related joints used to regulate the pressure or flow rate of the glycol ether additives, and any sensors (i.e., pressure, temperature, flow rate, etc.), gauges, and/or combinations thereof, and the like. The disclosed glycol ether additives may also directly or indirectly affect the mixing hopper 134 and the retention pit 132 and their assorted variations.

The disclosed glycol ether additives may also directly or indirectly affect the various downhole equipment and tools that may come into contact with the glycol ether additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed glycol ether additives may also directly or indirectly affect any downhole heat exchangers, valves and corresponding actuation devices, tool seals, packers and other wellbore isolation devices or components, and the like associated with the wellbore 116. The disclosed glycol ether additives may also directly or indirectly affect the drill bit 114, which may include, but is not limited to, roller cone bits, PDC bits, natural diamond bits, any hole openers, reamers, coring bits, etc.

While not specifically illustrated herein, the disclosed glycol ether additives may also directly or indirectly affect any transport or delivery equipment used to convey the glycol ether additives to the drilling assembly 100 such as, for example, any transport vessels, conduits, pipelines, trucks, tubulars, and/or pipes used to fluidically move the glycol ether additives from one location to another, any pumps, compressors, or motors used to drive the glycol ether additives into motion, any valves or related joints used to regulate the pressure or flow rate of the glycol ether additives, and any sensors (i.e., pressure and temperature), gauges, and/or combinations thereof, and the like.

The amount of glycol ether additive present in an invert emulsion fluid of the present disclosure may vary depending on several factors, including, but not limited to, the particular base oil used, the particular aqueous fluid used, any additives included in the invert emulsion fluid, and the particular application in which the invert emulsion fluid is to be employed. One of ordinary skill in the art with the benefit of this disclosure will be able to determine an appropriate amount. For example, the glycol ether additive may demonstrate a greater effect with an olefin base oil than a paraffin base oil, requiring a lower amount of the glycol ether additive to achieve a similar set of improvements in the suspension characteristics. Generally, the amount of the glycol ether additive may be sufficient to achieve the desired rheological properties. In addition, the density and oil water ratio of the invert emulsion fluid may have an effect on the amount of the glycol ether additive necessary to achieve the desired properties. In an embodiment, the glycol ether additive may be added in an amount of between about 0.1 to about 5 pounds per barrel of invert emulsion fluid ("ppb"). In a particular embodiment, the glycol ether additive may be added in an amount of between about 0.25 to about 1 ppb of invert emulsion fluid. In some embodiments, higher concentrations (i.e. greater than 1 pounder per barrel) may be used in packer fluids. In certain embodiments addition of thinners and/or wetters may allow higher concentrations to be used.

The invert emulsion fluids of the present disclosure may optionally contain a variety of additives. Examples of additives useful in the invert emulsion fluid may include, but are not limited to, solids, weighting agents, inert solids, fluid loss control agents, emulsifiers, salts, dispersion aids, corrosion inhibitors, emulsion thinners, emulsion thickeners, viscosifiers, and any combination thereof.

In an embodiment, the solids content, including the amount of weighting agents, drill solids, and any other solids in the fluid (e.g., hydrated lime) may be less than about 600 lb/bbl, or alternatively less than about 200 lb/bbl. Such solids, or weighting agents, which serve to increase the density of the invert emulsion fluids, may be any solids known to those skilled in the art as useful for such purpose. Examples of weighting agents may include, but are not limited to, barite, calcite, ilmenite, mullite, gallena, manganese oxides, iron oxides, mixtures of these and the like. For example, a ground barium sulfate additive having the trade name BAROID® 41 available from Halliburton Energy Services, Inc. in Houston, Tex., U.S.A. may be used as a weighting agent. The weighting material may typically be added in order to alter the density of the invert emulsion fluid. The density of the fluid may be less than about 20, or less than about 15, or alternatively less than about 10 pounds per gallon. One skilled in the art would be able to determine the amount of weighting agent to add to produce an invert emulsion fluid with a desired density.

In an embodiment, the invert emulsion fluid may comprise fluid-loss control additives, emulsifiers, or both. Fluid loss control agents such as modified lignite, polymers, oxidized asphalt and gilsonite may also be added to the invert emulsion fluid. Usually such fluid loss control agents are employed in an amount which is at least about 0.1, at least about 1, or at least about 5 percent by weight of the total fluid. For example, an additive having the trade name ADAPTA™ available from Halliburton Energy Services, Inc. in Houston, Tex., U.S.A. may be used as a fluid loss control additive. Alkali may also be used, preferably lime (calcium hydroxide or calcium oxide), to bind or react with acidic gases (e.g., $CO_2$ and $H_2S$) encountered during drilling in the formation. The quantity of free lime in a drilling fluid may range from about 1 to about 10 lbs/bbl, or more preferably about 1 to about 4 lbs/bbl, although lower ranges such as less than about 2 lbs/bbl are preferred for certain esters that tend to hydrolyze in the presence of alkaline compounds as will be known to those skilled in the art. Other suitable agents as an alternative to lime may also be used to adjust and/or stabilize invert emulsion fluids with respect to acids.

Various supplemental surfactants and wetting agents conventionally used in invert emulsion fluids may optionally be incorporated in the fluids of this disclosure. Such surfactants are, for example, fatty acids, soaps of fatty acids, amido amines, polyamines, imidazoline derivatives, oxidized crude tall oil, organic phosphate esters, alkyl aromatic sulfates and sulfonates, as well as, mixtures of the above. Generally, such surfactants are employed in an amount which does not interfere with the use of the fluids of this disclosure. For example, the surfactants or wetting agents may be used in an amount that does not interfere with the ability of an invert emulsion fluid to act as a drilling fluid and remove cuttings from the well bore.

Further, the invert emulsion fluid may comprise, have added to it, or mixed with the invert emulsion base, other fluids or materials. Such materials may include for example additives to reduce or control temperature rheology or to provide thinning, such as, for example, additives having the trade names COLDTROL®, RHEMOD™ L, ATC®, and OMC 2™; additives for providing temporary increased viscosity for shipping (transport to the well site) and for use in sweeps, such as, for example an additive having the trade name TEMPERUS™ (modified fatty acid); additives for bridging porous rock, such as, for example additives having the trade name BARACARB® 50; additives for high temperature high pressure filtration control (HTHP FILTRATE) and emulsion stability, such as, for example, additives having the trade name FACTANT™ (highly concentrated tall oil derivative); and additives for emulsification, such as, for example additives having the tradenames EZ MUL™ NT or LE SUPERMUL™ (polyaminated fatty acids). Blends of thinners such as those having the tradenames OMC 2™, COLDTROL®, and ATC® may also be effective in fluids of the present disclosure. All of the aforementioned trademarked products are available from Halliburton Energy Services, Inc. in Houston, Tex., U.S.A.

Viscosifying agents other than organophilic clays may optionally be employed in the invert emulsion fluids of the present disclosure. Usually, viscosifying agents such as oil soluble polymers, polycarboxylic acids and fatty acid soaps may be employed. The amount of viscosifying agent used in the composition will necessarily vary depending upon the end use of the composition. Usually such viscosifying agents are employed in an amount which is at least about 0.1, at least about 2, or at least about 5 percent by weight of the total fluid. For example, the TAU-MOD™ product available from Halliburton Energy Services, Inc. in Houston, Tex., U.S.A. may be used as a viscosifying agent. Alternatively, the glycol ether additives of the present disclosure may be used as the primary viscosifying agent.

Still further, dispersion aids, corrosion inhibitors and/or defoamers may be used. These and other suitable auxiliaries and additives are used in amounts known to those skilled in the art depending on the conditions of the particular well bore and subterranean formation.

Generally, the invert emulsion fluids of the present disclosure may be formed using any technique known in the art. For example, the components may be mixed together in any order under agitation condition. A representative method of preparing the invert emulsion fluids comprises mixing an appropriate quantity of base oil and an appropriate quantity of the glycol ether additive and any optional additives during continuous, mild agitation. An aqueous fluid is then added while mixing until an invert emulsion is formed. If weight material, such as those described above, are to be added, then the weight material is typically added after the invert emulsion fluid is formed. Alternatively, the invert emulsion fluids of the present disclosure may be prepared by simply adding the glycol ether additive to an existing stock of drilling fluid. The effectiveness of this treatment may depend on the constituents of the fluid.

The invert emulsion fluid may be used for any of a number of purposes known in the art. In general, the invert emulsion fluid may be used in any application that requires a viscous fluid capable of suspending a solid. For example, the invert emulsion fluid may be used as a drilling fluid. In a typical drilling operation, the invert emulsion fluid would be pumped through a drill string until it passed through a drill bit at the end of the drill string. The invert emulsion fluid may power the drill bit using a hydraulic motor while simultaneously lubricating the bit during operation. The invert emulsion fluid may then be returned to the surface through the annular space between the drill string and the bore hole wall. The invert emulsion fluid may be used to suspend the drill cuttings and return them to the surface. At the surface, the drill cuttings may be substantially separated from the invert emulsion fluid; whereupon the invert emulsion fluid is recycled downhole through the drill string to repeat the process.

An embodiment comprises a composition for use as an invert emulsion fluid. The composition comprises a base oil, an aqueous fluid, and a glycol ether additive.

Another embodiment comprises a method for preparing a composition for use as an invert emulsion fluid. The method comprises providing a base oil, providing an aqueous fluid, and providing a glycol ether additive. The method also comprises combining the base oil, the aqueous fluid, and the glycol ether additive to form an invert emulsion fluid.

Yet another embodiment comprises a method of using the invert emulsion fluid in a completion, workover, packer, logging, or gravel packing operation. In another embodiment, the invert emulsion fluid may be used for drilling a subterranean well. The method comprises providing an invert emulsion fluid, wherein the invert emulsion fluid has a base oil, an aqueous fluid, and a glycol ether additive. The method also comprises drilling a well using the invert emulsion fluid.

An embodiment comprises a method comprising: providing an invert emulsion fluid formed by combining components that comprise an oil-based continuous phase, an aqueous discontinuous phase, and a glycol ether additive that comprises a glycol ether; and using the invert emulsion fluid to drill at least a portion of a well bore penetrating at least a portion of a subterranean formation.

An embodiment comprises an invert emulsion fluid that comprises an oil-based continuous phase, an aqueous discontinuous phase, and a glycol ether additive comprising a glycol ether.

An embodiment comprises a method of preparing an invert emulsion fluid comprising: providing a base oil, providing an aqueous fluid, providing a glycol either additive comprising a glycol ether, and combining the base oil, the aqueous fluid, and the glycol ether additive to form an invert emulsion fluid. The base oil comprises a continuous phase and the aqueous fluid comprises a discontinuous phase of the invert emulsion fluid. The glycol ether additive substantially increases the low-shear viscosity at elevated temperatures of the invert emulsion fluid relative to a fluid without a glycol ether additive.

An embodiment comprises method comprising: providing an oil-based fluid formed by combining components that comprise: a glycol ether additive comprising a glycol ether, wherein the glycol ether additive substantially increases the low-shear viscosity of the oil-based fluid at temperatures between approximately 120 degrees Fahrenheit and 500 degrees Fahrenheit; and using the oil based fluid to drill at least a portion of a well bore penetrating at least a portion of a subterranean formation.

An embodiment comprises an invert emulsion fluid comprising an oil-based continuous phase, an aqueous internal phase, and a glycol ether additive comprising a glycol ether. The glycol ether additive substantially increases the low-shear viscosity of the invert emulsion fluid at temperatures between approximately 120 degrees Fahrenheit and 500 degrees Fahrenheit.

An embodiment comprises a method comprising: providing an invert emulsion fluid formed by combining components that comprise an oil-based continuous phase, an aqueous internal phase, a glycol ether additive comprising a glycol ether, wherein the glycol ether additive substantially increases the low-shear viscosity of the invert emulsion fluid at temperatures between approximately 120 degrees Fahrenheit and 500 degrees Fahrenheit; and using the invert emulsion fluid to drill at least a portion of a well bore penetrating at least a portion of a subterranean formation.

To facilitate a better understanding of the present disclosure, the following representative examples of certain aspects of some embodiments are given. In no way should the following examples be read to limit, or define, the scope of the claims or disclosure.

EXAMPLES

The following examples are submitted for the purpose of demonstrating the performance characteristics of the invert emulsion fluids of the present disclosure. These tests were conducted substantially in accordance with the test methods described in ANSI/API RP 13B-2: Recommended Practice for Field Testing Oil-based Drilling Fluids unless stated otherwise. The following abbreviations may be used in describing the results of the experimentation.

"PV" is plastic viscosity as described above, which is one variable used in the calculation of viscosity characteristics of an invert emulsion fluid and is measured in units of centipoise (cp).

"YP" is yield point as described above, which is another variable used in the calculation of viscosity characteristics of invert emulsion fluids, measured in pounds per 100 square feet (lb/100 ft$^2$).

"TAU Zero" is the yield stress, which is the stress that must be applied to a material to make it begin to flow (or yield), and is commonly reported in pounds per 100 square feet (lb/100 ft$^2$).

"LSYP" is the low-shear yield point, measured in pounds per 100 square feet (lb/100 ft$^2$).

As used in the formulation of the invert emulsion fluids illustrated in the following examples the following component names are intended to mean the following:

The Escaid™ 110 product is a cyclic paraffin base oil distributed by Exxon of Houston, Tex.

The BAROID ALKANE™ product is linear paraffin base oil distributed by Halliburton Energy Services, Inc. of Houston, Tex.

The EDC 99-DW product is a mineral base oil distributed by Total of France.

The ADAPTA® product is a filtration control agent distributed by Halliburton Energy Services, Inc. of Houston, Tex.

The EZ MUL™ NT product is an emulsification agent distributed by Halliburton Energy Services, Inc. of Houston, Tex.

The BAROID® 41 product comprises barium sulfate as a weighting agent and is distributed by Halliburton Energy Services, Inc. in Houston, Tex.

The TAU-MOD™ product is a viscosifying agent distributed by Halliburton Energy Services, Inc. in Houston, Tex.

The BARACARB® product is a sized marble bridging agent distributed by Halliburton Energy Services, Inc. in Houston, Tex.

The REV DUST™ product is an artificial drill solid distributed by Milwhite, Inc. of Houston, Tex.

The RHEMOD™ L product is a viscosifying agent distributed by Halliburton Energy Services, Inc. in Houston, Tex. While the RHEMOD™ L product may affect the rheological properties of a fluid to which it is added, the RHEMOD™ L product should not be considered a glycol ether additive of the present disclosure.

The LE SUPERMUL™ product is a polyaminated fatty acid that can be used to emulsify water distributed by Halliburton Energy Services, Inc. in Houston, Tex.

Sodium bentonite clay is distributed by a number of suppliers including Halliburton Energy Services, Inc. in Houston, Tex.

The OMC® 42 oil-based mud conditioner is a thinner/dispersant distributed by Halliburton Energy Services, Inc. in Houston, Tex.

The Bara ECD™ product is an invert emulsion drilling fluid distributed by Halliburton Energy Services, Inc. in Houston, Tex.

The VersaFlex® ECD product is an invert emulsion drilling fluid distributed by Halliburton Energy Services, Inc. in Houston, Tex.

Example 1

Approximately 1 pound-per-barrel (ppb) of BDF-568, containing approximately 10-30% of TGBE, a glycol ether, and micronized barite were added to Bara ECD™ #42, an invert emulsion drilling fluid. The resulting fluid was analyzed at varying temperatures and pressures using a FANN 77 Rheometer. The measured rheological properties of the resulting fluid are shown below in Table 1.

TABLE 1

Rheology of Bara ECD ™ #42 containing 1 ppb BDF-568 from 122° F. to 350° F.

| | Pressure | | | | | | | | | |
|---|---|---|---|---|---|---|---|---|---|---|
| | 0 | 2000 | 6792 | 7343 | 9011 | 9742 | 11602 | 12543 | 2000 | 0 |
| | Temp | | | | | | | | | |
| RPM | 122 F. Dial Reading | 122 F. Dial Reading | 250 F. Dial Reading | 250 F. Dial Reading | 300 F. Dial Reading | 300 F. Dial Reading | 350 F. Dial Reading | 350 F. Dial Reading | 122 F. Dial Reading | 122 F. Dial Reading |
| 600 | 58.7 | 70.2 | 83.9 | 87.1 | 87.8 | 91.4 | 96.2 | 101.5 | 99.8 | 85.2 |
| 300 | 33.4 | 39.7 | 52.7 | 54.2 | 57.2 | 58.7 | 69.5 | 74.6 | 59 | 47.9 |
| 200 | 25.2 | 29.6 | 43 | 43.8 | 47.4 | 48.6 | 59.4 | 63.3 | 44 | 35.1 |
| 100 | 16.4 | 18.8 | 30.7 | 31.2 | 34.7 | 35.4 | 46.9 | 51 | 28.1 | 22.1 |
| 6 | 4.6 | 4.5 | 16 | 15.8 | 19.3 | 19.7 | 32.5 | 36.4 | 10.8 | 7.7 |
| 3 | 3.2 | 3.3 | 15.1 | 15 | 18.5 | 19 | 31.5 | 35.5 | 9.5 | 5.6 |
| PV | 25.3 | 30.5 | 31.2 | 32.9 | 30.6 | 32.7 | 26.7 | 26.9 | 40.8 | 37.3 |
| YP | 8.1 | 9.2 | 21.5 | 21.3 | 26.6 | 26 | 42.8 | 47.7 | 18.2 | 10.6 |
| LSYP | 1.8 | 2.1 | 14.2 | 14.2 | 17.7 | 18.3 | 30.5 | 34.6 | 8.2 | 3.5 |

Figure 2:
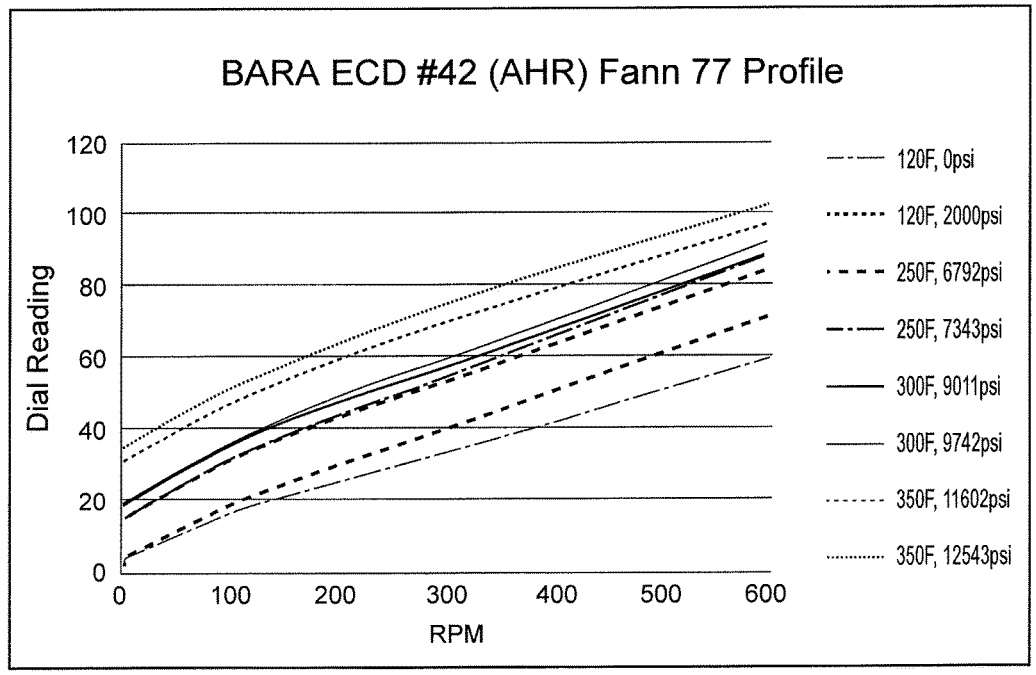
FIG. 2 illustrates a graph of the rheological properties of an invert emulsion fluid containing a glycol ether additive.
Figure 3:
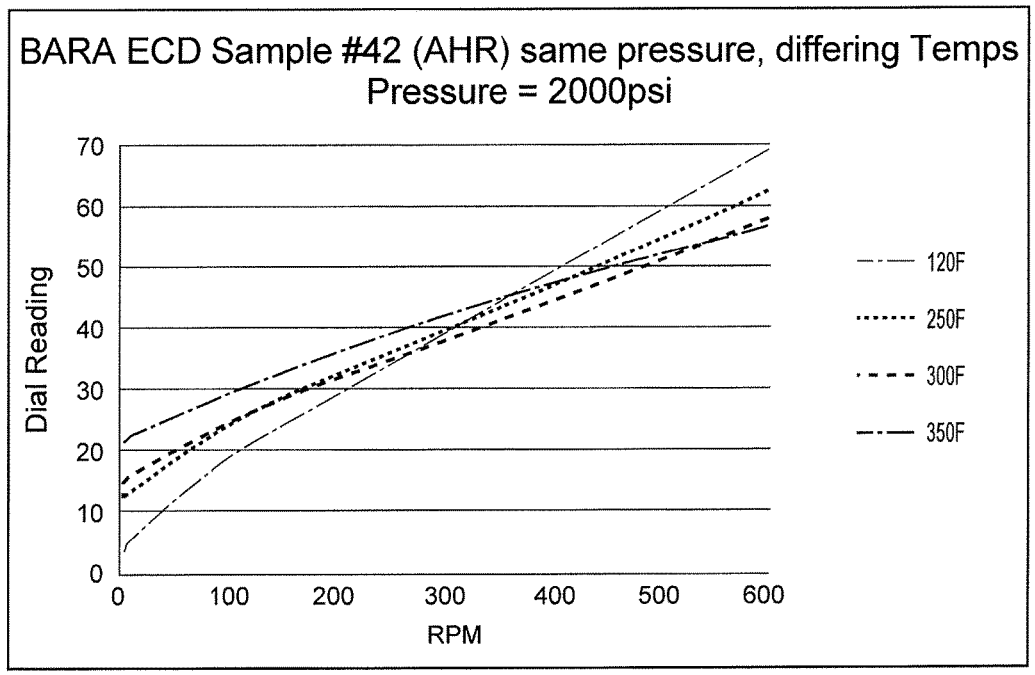
FIG. 3 illustrates another graph of the rheological properties of an invert emulsion fluid containing a glycol ether additive.
Figure 4:
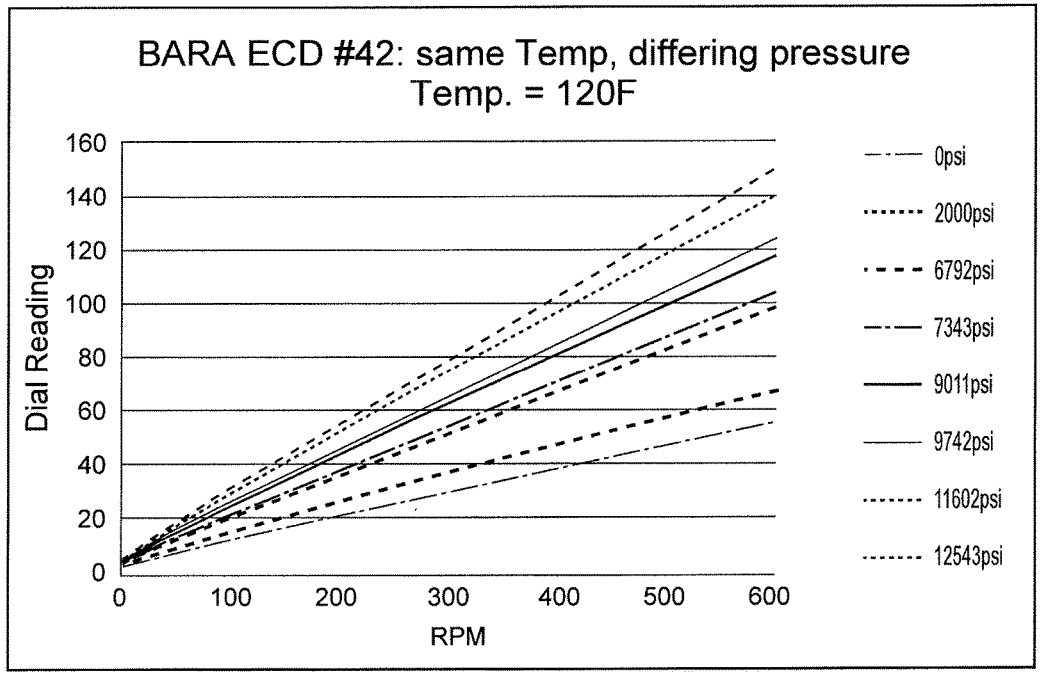
FIG. 4 illustrates yet another graph of the rheological properties of an invert emulsion fluid containing a glycol ether additive.

FIG. 2 illustrates the data presented in Table 1 in graphical format. As can be seen the low-shear viscosity of the fluid increases with increasing temperature. FIG. 3 illustrates measurements made on a FANN 77 Rheometer of the same fluid as described with respect to Table 1 while holding pressure constant and varying temperature. At a constant pressure, it can be seen that a low shear rates, corresponding to 3 and 6 RPM, dial readings (viscosity) increase with increasing temperature. At high shear rates, the dial readings decrease with increasing temperature. FIG. 4 illustrates measurements made on a FANN 77 Rheometer of the same fluid as described with respect to Table 1 while holding temperature constant and varying pressure. At low shear rates, no change in viscosity is seen with increasing pressure, while with increasing shear rates viscosity is seen to increase with increasing pressure.

Figure 5:
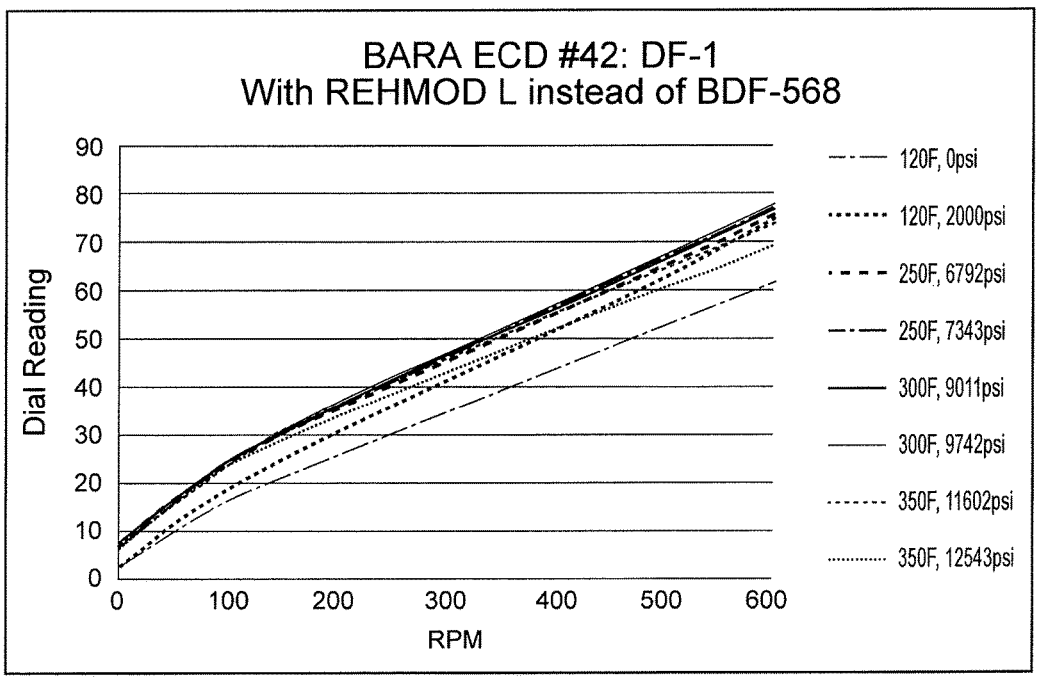
FIG. 5 illustrates a graph of the rheological properties of an invert emulsion fluid that does not contain a glycol ether additive.

FIG. 5 illustrates measurements made on a FANN 77 Rheometer of Bara ECD #42 containing 1 ppb of Rhemod-L. Rhemod-L is a dimer/trimer fatty acid viscosifier that is similar to BDF-568, but does not contain a glycol ether. As can be seen from FIG. 5 a viscosifier that does not contain a glycol ether does not show appreciably increased viscosity at low shear rates.

Figure 6:
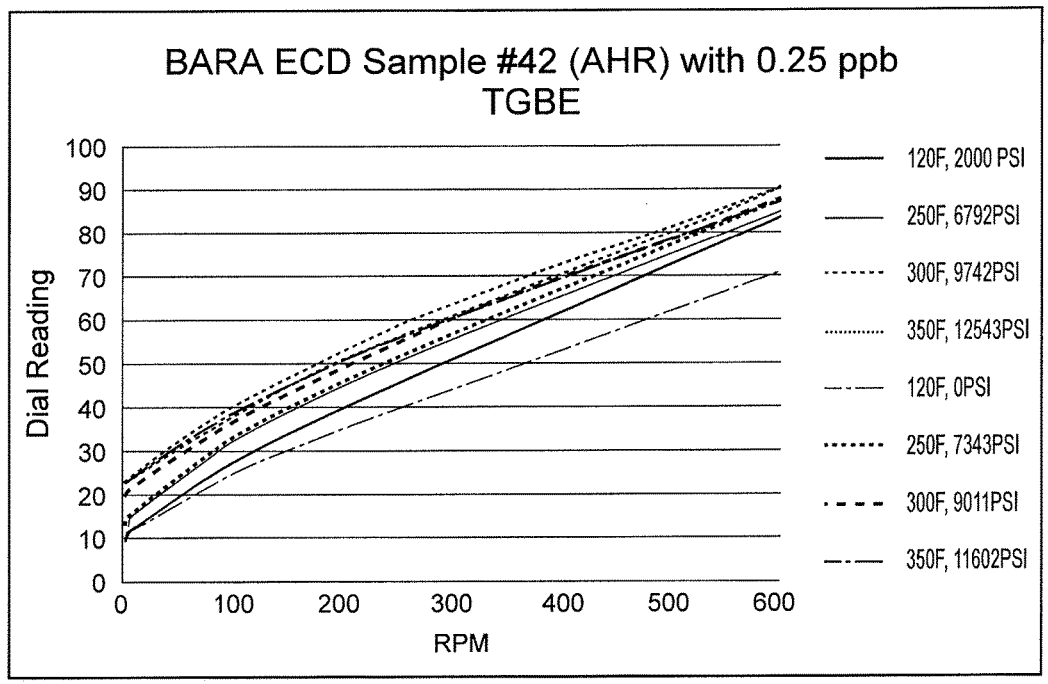
FIG. 6 illustrates a graph of the rheological properties of an invert emulsion fluid containing the glycol ether additive triethylene glycol butyl ether.

FIG. 6 illustrates measurements made on a FANN 77 Rheometer of Bara ECD #42 containing .25 ppb of triethylene glycol butyl ether (TGBE) instead of BDF-568. TGBE is a glycol ether that is a component of BDF-568, but does not contain a dimer / trimer fatty acid. As can be seen from FIG. 6, TGBE exhibits the same increase in low shear viscosity with increasing temperature that is seen with BDF-568.

Figure 7:
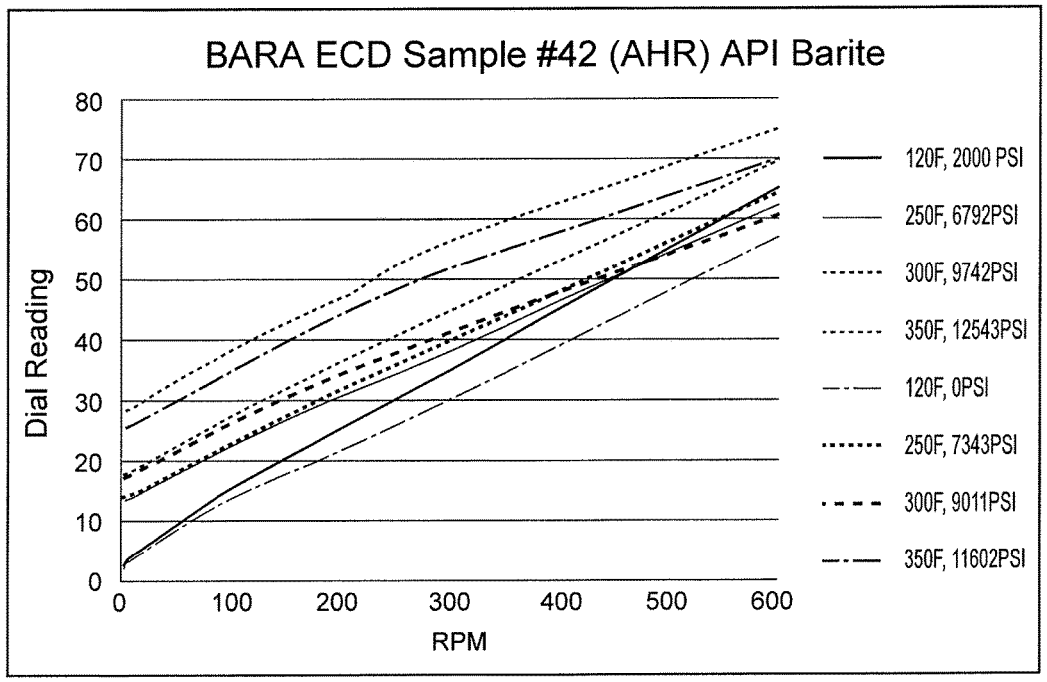
FIG. 7 illustrates a graph of the rheological properties of an invert emulsion fluid containing API barite.

FIG. 7 illustrates measurements made on a FANN 77 Rheometer of Bara ECD™ #42 containing approximately 1 ppb of BDF-568 as well as API barite instead of micronized barite (as was used to generate FIGS. 2-6). As can be seen from FIG. 7, increased low shear viscosity is seen with increasing temperature when API barite is used. As can be seen from FIGS. 2 and 7 increased low shear viscosity is seen with increasing temperature regardless of the type of barite used.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    providing an invert emulsion fluid formed by combining components that comprise:
        an oil-based continuous phase,
        an aqueous internal phase,
        a glycol ether additive comprising a triethylene glycol ether,
    wherein dimer/trimer fatty acids and esters thereof are absent from the invert emulsion fluid, and
    wherein polyamides are absent from the invert emulsion fluid; and
    using the invert emulsion fluid to drill at least a portion of a well bore penetrating at least a portion of a subterranean formation;
    wherein the glycol ether additive increases the viscosity of the invert emulsion fluid at a shear rate of from 3 RPM to 6 RPM and at a temperature of from about 120° F. to about 500° F. relative to a fluid without the glycol ether additive.

2. The method of claim 1, wherein the invert emulsion fluid comprises from about 0.25 pounds (0.11 kg) to about 1 pounds (0.45 kg) per barrel of the glycol ether additive.

3. The method of claim 1, wherein the oil-based continuous phase comprises at least one oil selected from the group consisting of: a paraffin oil, a mineral oil, a synthetic oil, a diesel oil, and any combination thereof.

4. The method of claim 1, wherein the oil-based continuous phase comprises greater than about 30% by volume of the total fluid.

5. The method of claim 1, wherein the glycol ether additive comprises at least one glycol ether selected from the group consisting of: triethylene glycol butyl ether, triethylene glycol propyl ether, triethylene glycol methyl ether, triethylene glycol ethyl ether, and triethylene glycol isopropyl ether.

6. The method of claim 1, wherein the invert emulsion fluid comprises from about 0.1 pounds per barrel to about 5 pounds per barrel of the glycol ether additive.

7. The method of claim 1 wherein the portion of the subterranean formation is at a temperature of at least about 300° F.

8. The method of claim 1 wherein the glycol ether additive comprises triethylene glycol butyl ether.

* * * * *